(12) United States Patent
Liggett et al.

(10) Patent No.: US 10,093,328 B2
(45) Date of Patent: Oct. 9, 2018

(54) IN-LINE BRAKE

(71) Applicant: Ropes Courses, Inc., Allegan, MI (US)

(72) Inventors: James Allen Liggett, Allegan, MI (US); Sean Raymond Horihan, Allegan, MI (US)

(73) Assignee: ROPES COURSES, INC., Allegan, MI (US)

( * ) Notice: Subject to any disclaimer, the term of this patent is extended or adjusted under 35 U.S.C. 154(b) by 272 days.

(21) Appl. No.: 15/067,463

(22) Filed: Mar. 11, 2016

(65) Prior Publication Data

US 2016/0272225 A1    Sep. 22, 2016

Related U.S. Application Data

(63) Continuation-in-part of application No. 14/170,739, filed on Mar. 2, 2014, now Pat. No. 9,884,633.

(51) Int. Cl.
| | |
|---|---|
| B61H 9/02 | (2006.01) |
| B61B 12/02 | (2006.01) |
| B61B 3/00 | (2006.01) |
| B60T 7/18 | (2006.01) |
| F16D 63/00 | (2006.01) |

(52) U.S. Cl.
CPC .......... B61H 9/02 (2013.01); B60T 7/18 (2013.01); B61B 3/00 (2013.01); B61B 12/028 (2013.01); F16D 63/008 (2013.01)

(58) Field of Classification Search
CPC ............. B02T 7/18; B61B 3/00; B61H 9/02
USPC .................................. 104/94, 113; 105/155
See application file for complete search history.

(56) References Cited

U.S. PATENT DOCUMENTS

| | | | |
|---|---|---|---|
| 301,923 | A | 7/1884 | Reisdorff |
| 318,627 | A | 5/1885 | Keller |
| 1,920,744 | A | 8/1933 | Webb |
| 3,039,401 | A | 6/1962 | Bishop |
| 3,563,539 | A | 2/1971 | Rogers et al. |
| 3,577,930 | A | 5/1971 | Rooklyn |
| 3,860,089 | A | 1/1975 | Huggett |
| 3,875,866 | A | 4/1975 | Mazuyer |
| 4,267,900 | A | 5/1981 | Yin-Lung |
| 4,401,033 | A | 8/1983 | Gerken |
| 4,464,997 | A | 8/1984 | Dehne |
| 4,592,686 | A | 6/1986 | Andrews |
| 4,752,987 | A | 6/1988 | Dreyer et al. |
| 4,845,806 | A | 6/1989 | Hamacher |
| 5,156,233 | A | 10/1992 | Olsen et al. |
| 5,271,481 | A | 12/1993 | Rich |
| 5,468,199 | A | 11/1995 | Keeler et al. |
| 5,890,328 | A | 4/1999 | Gleave |
| 5,924,260 | A | 7/1999 | Austin et al. |

(Continued)

FOREIGN PATENT DOCUMENTS

DE    102008006611 B3    6/2009

OTHER PUBLICATIONS

U.S. Appl. No. 14/170,739, filed Feb. 3, 2014, inventor S. Horihan.

*Primary Examiner* — Zachary L Kuhfuss
(74) *Attorney, Agent, or Firm* — Polson Intellectual Property Law, PC; Margaret Polson

(57) ABSTRACT

An in-line brake having a displaceable carriage for slowing and stopping a zip track trolley, that allows the trolley to continue in its direction of travel after it stops. The carriage is then repositioned automatically to stop the next trolley.

7 Claims, 5 Drawing Sheets

(56) References Cited

U.S. PATENT DOCUMENTS

| | | |
|---|---|---|
| 6,244,991 B1 | 6/2001 | Bingham |
| 6,269,944 B1 | 8/2001 | Taylor |
| 6,315,138 B1 | 11/2001 | Dyson |
| 6,374,456 B1 | 4/2002 | Fort et al. |
| 6,412,611 B1 * | 7/2002 | Pribonic ............... B60L 7/28 187/375 |
| 6,666,773 B1 | 12/2003 | Richardson |
| 7,175,534 B2 * | 2/2007 | Liggett ............... A63G 31/02 472/136 |
| 7,381,137 B2 * | 6/2008 | Steele ............... B61B 7/00 104/113 |
| 7,392,747 B2 | 7/2008 | Ksyk |
| 7,966,941 B1 | 6/2011 | Brannan |
| 7,992,680 B2 | 8/2011 | Small |
| 8,001,904 B2 | 8/2011 | Maes et al. |
| 8,025,131 B1 * | 9/2011 | Boren ............... A63G 21/22 188/165 |
| 8,037,978 B1 * | 10/2011 | Boren ............... H02K 49/04 104/281 |
| 8,286,559 B2 * | 10/2012 | Robinson ............... B64D 25/06 104/94 |
| 8,393,277 B2 | 3/2013 | Johnston et al. |
| 8,783,190 B2 * | 7/2014 | Boren ............... B61B 7/00 104/113 |
| 8,807,292 B2 * | 8/2014 | Liston ............... A63G 21/20 104/113 |
| 8,960,098 B2 * | 2/2015 | Boren ............... B61B 12/00 104/117.1 |
| 9,021,962 B2 * | 5/2015 | Hackett ............... F16D 63/008 104/113 |
| 9,033,115 B2 * | 5/2015 | Lerner ............... B61H 9/02 188/62 |
| 9,120,023 B1 | 9/2015 | Burroughs |
| 9,573,605 B2 * | 2/2017 | Steele ............... A63G 21/22 |
| 2002/0162477 A1 * | 11/2002 | Palumbo ............... B61B 7/00 104/87 |
| 2004/0262103 A1 * | 12/2004 | Rosner ............... B60L 7/28 188/164 |
| 2006/0027134 A1 | 2/2006 | Steele et al. |
| 2006/0090960 A1 | 5/2006 | Liggett |
| 2006/0278478 A1 * | 12/2006 | Pribonic ............... B61H 7/083 188/159 |
| 2009/0014259 A1 | 1/2009 | Cylvick |
| 2009/0049946 A1 * | 2/2009 | Buckman ............... A63G 21/22 74/502.2 |
| 2009/0078148 A1 | 3/2009 | Cylvick |
| 2009/0255436 A1 * | 10/2009 | Buckman ............... A63G 21/22 104/117.1 |
| 2009/0266267 A1 | 10/2009 | Moss |
| 2010/0078262 A1 | 4/2010 | Townend et al. |
| 2011/0132224 A1 | 6/2011 | Kitchen |
| 2011/0162917 A1 | 7/2011 | Steele et al. |
| 2011/0239895 A1 | 10/2011 | Liggett |
| 2012/0067246 A1 | 3/2012 | Liggett |
| 2012/0083350 A1 | 4/2012 | Frankowski et al. |
| 2012/0145498 A1 * | 6/2012 | Liston ............... A63G 21/20 188/378 |
| 2012/0298443 A1 | 11/2012 | Liggett |
| 2013/0118842 A1 | 5/2013 | Lerner |
| 2013/0228092 A1 | 9/2013 | Liggett et al. |
| 2013/0239841 A1 | 9/2013 | Boren |
| 2013/0239842 A1 * | 9/2013 | Boren ............... B61B 7/00 104/113 |
| 2013/0239843 A1 | 9/2013 | Boren |
| 2014/0150685 A1 * | 6/2014 | Checketts ............... B61H 9/02 104/113 |
| 2015/0217783 A1 * | 8/2015 | Horihan ............... B61B 3/00 104/113 |
| 2016/0272225 A1 * | 9/2016 | Liggett ............... B61H 9/02 |
| 2017/0036123 A1 * | 2/2017 | Liggett ............... A63G 21/20 |
| 2017/0088150 A1 * | 3/2017 | Christinet ............... B61H 9/02 |
| 2017/0259181 A1 * | 9/2017 | Cylvick ............... A63G 21/22 |

* cited by examiner

IN-LINE BRAKE

FIELD OF THE INVENTION

This invention relates to a brake system that can be used in a variety of environments, but particularly challenge courses.

BACKGROUND OF THE INVENTION

A zip track is a structure that allows a person to displace from, usually a higher location to a lower location due to the force of gravity. The zip track is usually made of a track, and a trolley that rolls or is otherwise displaced in the track. Sometimes zip tracks are integrated with challenge courses.

Challenge courses are structures that allow a person or team to challenge themselves by participating in various events such as walking along swinging ropes or planks, at elevated heights. These courses are also used to train military personnel. These courses are also used at recreational parks or other such centers that have go-carts and miniature golf.

The zip track trolley and the user, generally start from a dead stop, and then increase speed, and then decreases speed to stop at the desired location.

There exists a need to decelerate and stop the trolley within a certain distance.

There also exists a need to decelerate the trolley at a gradual and safe speed.

The present invention causes the trolley to decelerate within a certain distance at a safe speed.

Multiple embodiments of the system are disclosed herein. It will be understood that other objects and purposes of the invention, and variations thereof, will be apparent upon reading the following specification and inspecting the accompanying drawings.

REFERENCE NUMERALS LIST 10 present invention, in line brake
20 carriage
30 arm
40 front wheel
50 brake track
60 closed position
70 zip track
80 open position
90 rear wheel
100 user
110 harness strap
120 landing platform
130 trolley
140 trolley direction of travel
150 channel
160 brake track termination area
170 extension
180 strap
190 retraction means
200 means to decelerate the carriage
210 trolley engagement means
220 hinge

SUMMARY OF THE INVENTION

One aspect of the present invention is an in-line brake 10, comprising: a brake track 50; a carriage 20 movably disposed within said brake track 50; a means to decelerate said carriage 200; a trolley engagement means 210 integrated with said carriage 20 to engage with a trolley 130 moving in a direction of travel 140 when said carriage 20 is in a closed position 60, whereby, when said trolley 130 engages with said trolley engagement means 210 said carriage 20 is displaced through a means to decelerate said carriage 200; and said carriage 20 capable of being positioned in an open position 80 so that said trolley 130 can continue to move in the direction of travel 140.

Another aspect of the present invention an in-line brake 10, comprising: a brake track 50; a carriage 20 movably disposed within said brake track 50; a means to decelerate said carriage 200; a trolley engagement means 210 integrated with said carriage 20 to engage with a trolley 130 moving in a direction of travel 140 when said carriage 20 is in a closed position 60, whereby, when said trolley 130 engages with said trolley engagement means 210 said carriage 20 is displaced through a means to decelerate said carriage 200; said carriage 20 capable of being positioned in an open position 80 so that said trolley 130 can continue to move in the direction of travel 140;

said trolley 130 movably disposed within a zip track 70; a harness strap 110 connected to said trolley 130; wherein said trolley engagement means 210 is an arm 30 disposed on said carriage 20 extending from said brake track 50 across said trolley's direction of travel 140 when said carriage is in a closed position 60, and said carriage 20 having a hinge 220 and a front wheel 40 rollably engaged with said brake track 50; said brake track 50 has a brake track termination area 160 having an extension 170 that extends away from said zip track 50 and oriented substantially perpendicular to said direction of travel 140; said carriage 20 can pivot via said hinge 220 to enable said front wheel 40 to roll on said extension 170; a retraction means 190 to displace said carriage 20 opposite said direction of travel 140 and reposition said carriage 20 into a closed position 60; and a harness strap 110 attached to said trolley 130; said harness strap 110 extending downwardly from said trolley 130; wherein when said trolley 130 is travelling in the direction of travel 140 the trolley 130 is descending toward a landing platform 120.

These and other features, aspects and advantages of the present invention will become better understood with reference to the following drawings, description and claims.

DETAILED DESCRIPTION OF THE INVENTION

Figure 1:
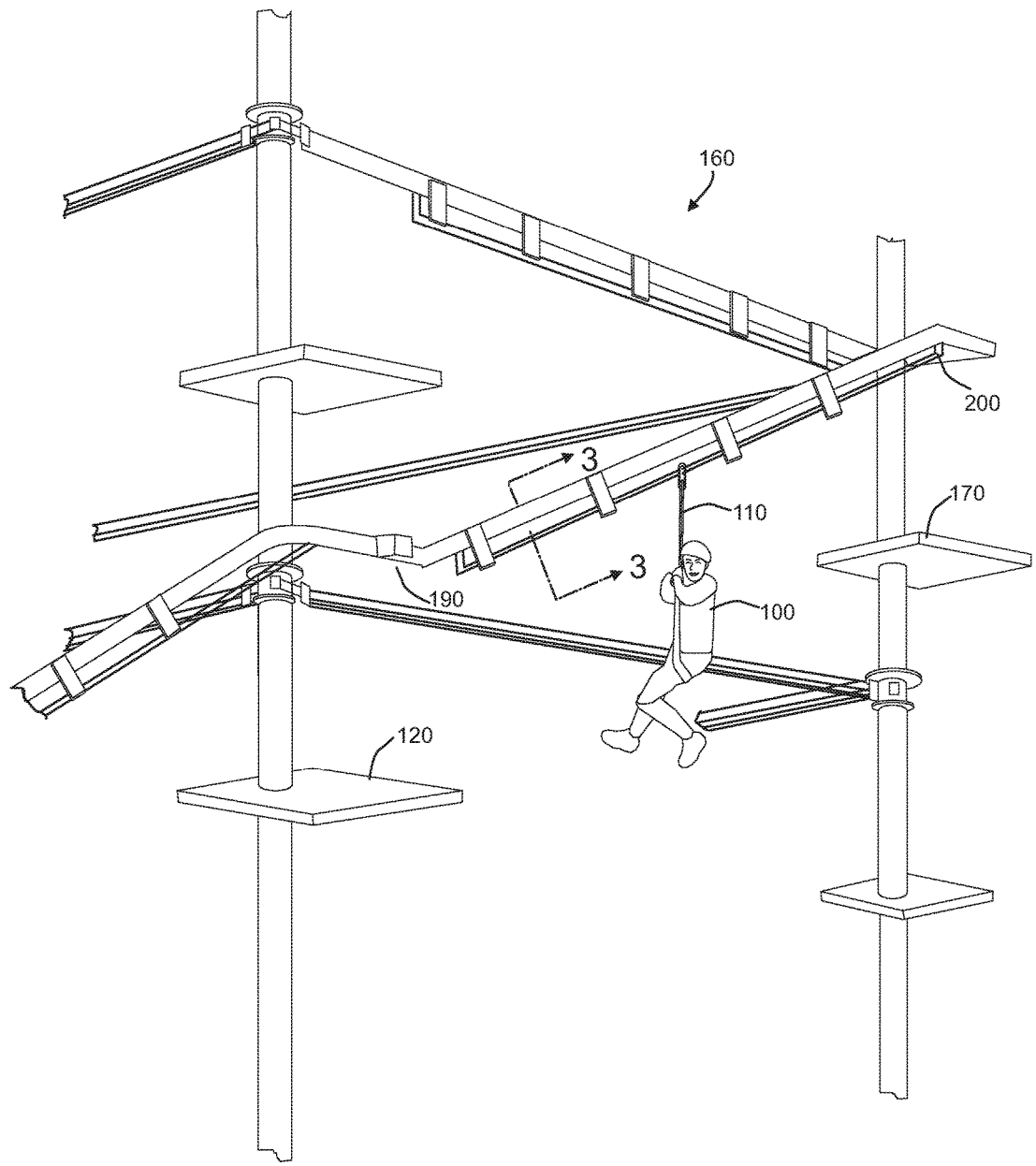
FIG. 1 is a pictorial view of one embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Certain terminology will be used in the following description for convenience and reference only, and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the system and designated parts. Said terminology will include the words specifically mentioned, derivatives, and similar words. Also, "connected to," "secured to," or similar language includes the definitions "indirectly connected to," "directly connected to," "indirectly secured to," and "directly secured to."

Figure 2:
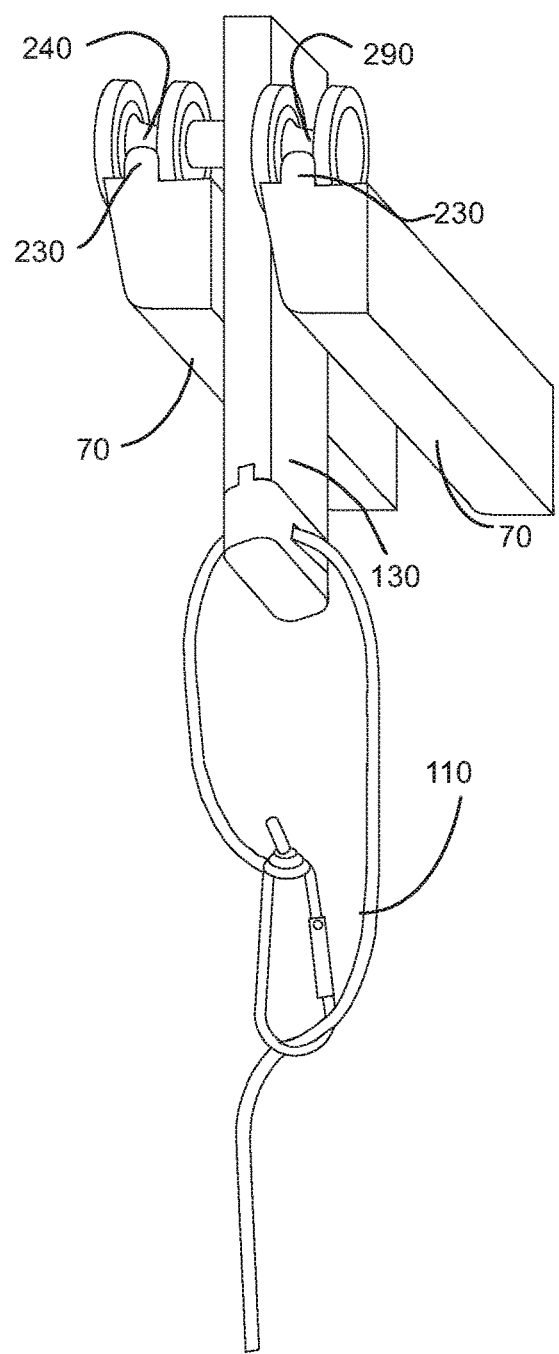
FIG. 2 is a pictorial view of a trolley and zip track that utilizes the present invention for slowing and stopping.

FIG. 1 illustrates one embodiment of the present invention in use, with the user 100 connected to a harness strap 110. The harness strap 110 is secured to a trolley 130 that can roll along the zip track 70, as seen in FIG. 2.

Figure 3:
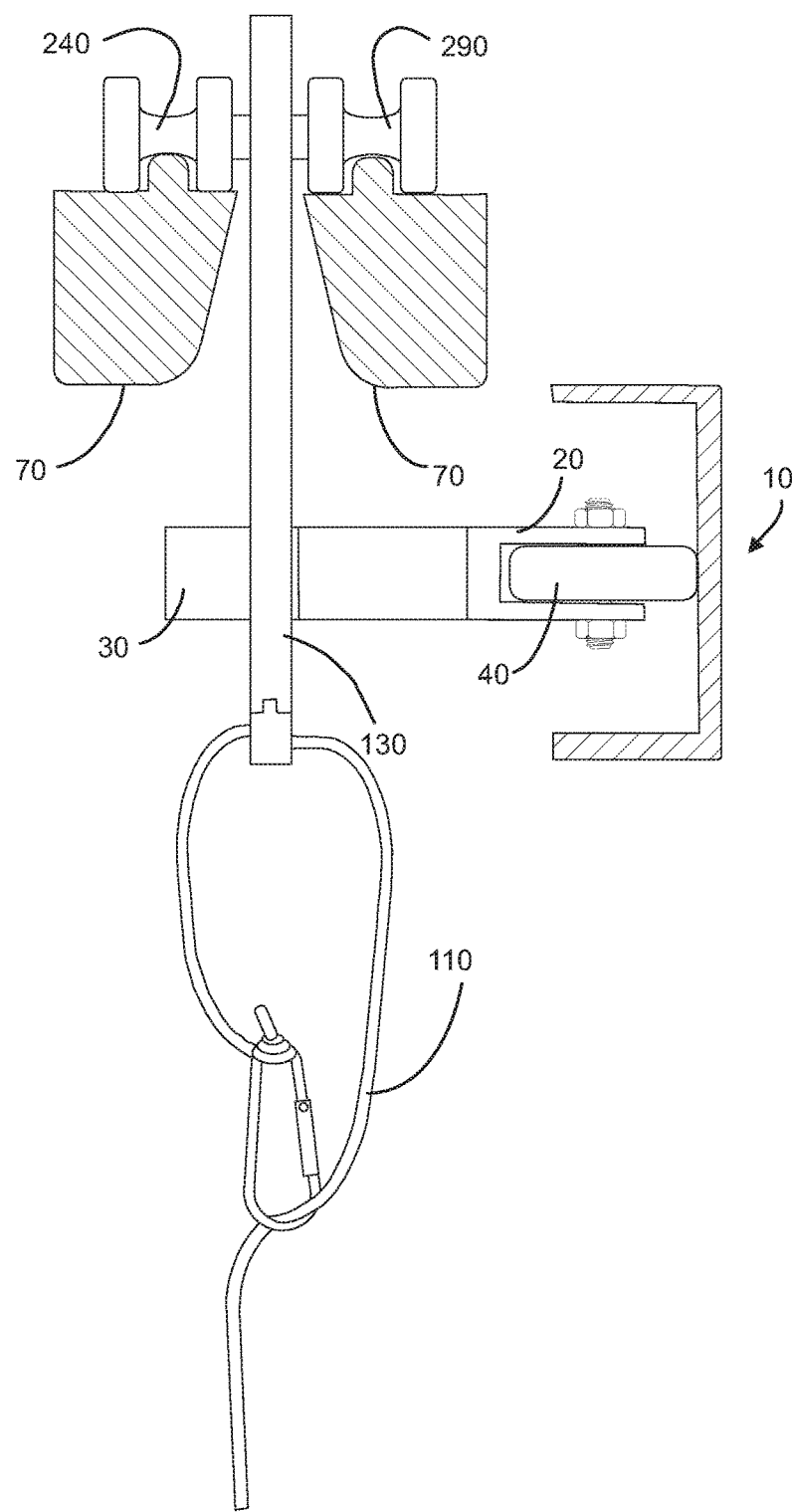
FIG. 3 is another pictorial view of a cross section A-A from FIG. 1.

FIG. 3 is a cross sectional view along lines A-A. The trolley 130 is illustrated being movably disposed within the zip track 70. The in-line brake 10 is shown adjacent to the trolley 130. The carriage 20 is movably disposed within the brake track 50. The trolley engagement means 210 is shown in position to contact, brake, and stop the trolley 170.

Figure 4:
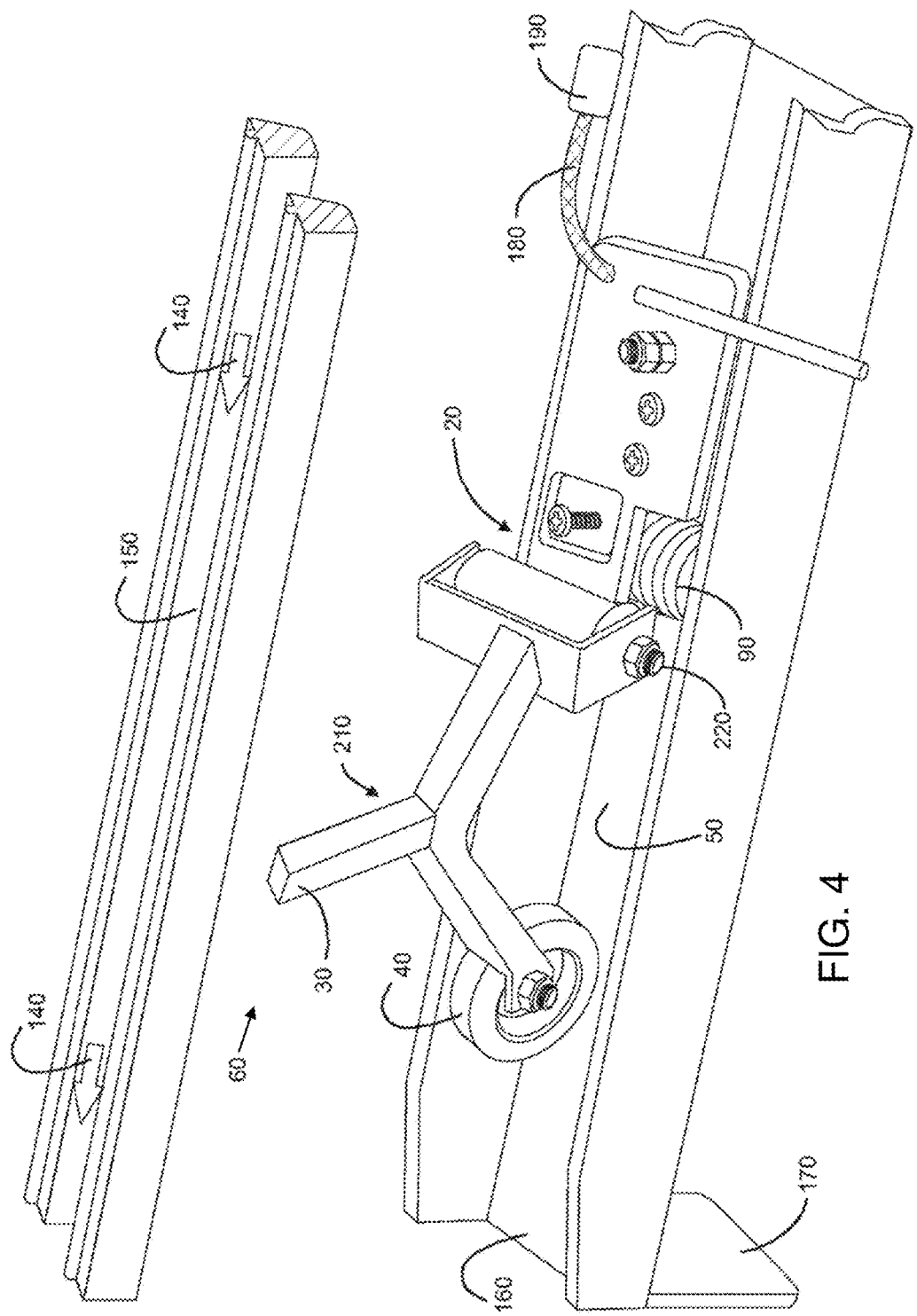
FIG. 4 is another pictorial view of the present invention with the in line brake in the closed position.

FIG. 4 illustrates the in-line brake 10 in the closed position 60. This is called the closed position 60 because the trolley 130 cannot move past the trolley engagement means 210.

In one embodiment the trolley engagement means 210 may be an arm 30 extending in the way of the trolley 130 so when the trolley 130 is traversing in the direction of travel 140, some portion of the trolley 130 will contact the arm 30. The carriage 20 will then displace in the direction of travel 140 in the brake track 50. FIG. 4 also illustrates the carriage having a rear wheel 90 and a front wheel 40 to provide a means of moving the carriage 20 within the brake track 50.

By force of the trolley 130 contacting the arm 30, the carriage 20 is then displaced within the brake track 50 and as the trolley 130 reaches the end of its run, the carriage 20 may engage with a means to decelerate the carriage 200 to slow the carriage 20 and the trolley 130 to a stop.

In one embodiment the means to decelerate the carriage 200 may be the carriage passing between a set of strong magnets permanently attached to the brake track 50. As the carriage 20 passes within the magnetic field, resistance is created causing a braking effect to occur until the carriage 20 and trolley 130 stop.

Figure 5:
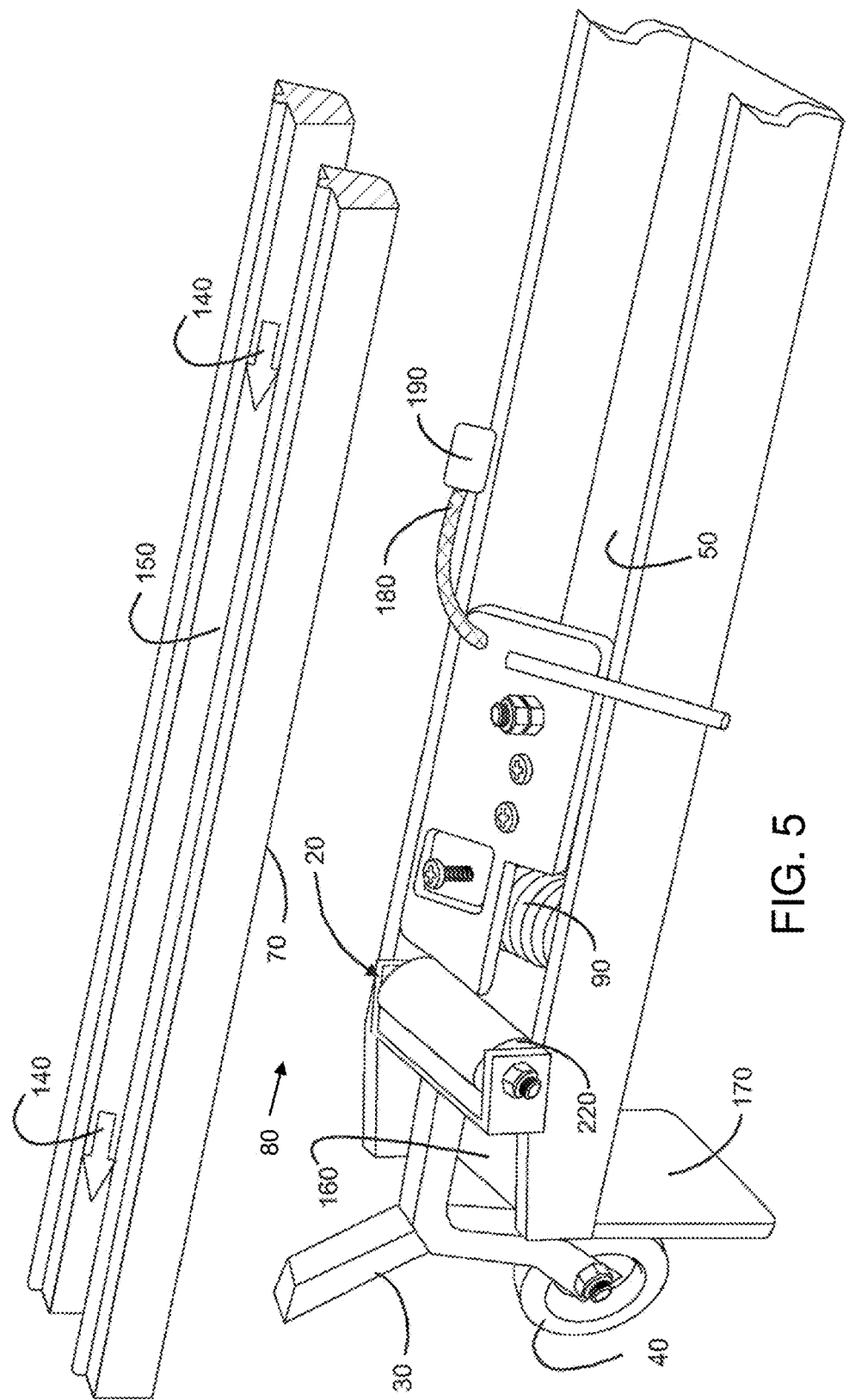
FIG. 5 is another pictorial view of the present invention with the in line brake in the open position.

After the trolley 130 and carriage 20 comes to a stop, then the carriage 20 can be displaced further in the direction of travel 140 until the arm 30 can be moved away from the trolley 130 or away from the zip track 70 so as to allow the trolley 130 to continue to move within the zip track 70, as illustrated in FIG. 5.

In one embodiment the carriage 20 may have a front wheel 40 that can roll within the brake track 50 until it reaches a brake track termination area 160. The front wheel 40 can then roll on an extension 170, that extends substantially perpendicular to the direction of travel 140 and away from the zip track 70, which causes the arm 30 to move away from the zip track 70 to place the arm 30 in an open position 80, to create clearance for the trolley 130 to continue to move along the zip track 70. A hinge 220 allows the front wheel 40 to pivot to the open position 80 or a closed position 60.

The carriage 20 may also be attached to a retraction means 190 to pull the carriage 20 back into a desired position along the brake track 50 and into a closed position 60.

One type of retraction means 190 is a strap 180 attached to a conventional retraction device. Another retraction means 190 may be a spring.

When the trolley 130 is moving along the direction of travel 140, it is descending toward a landing platform 120.

It should be understood, of course, that the foregoing relates to exemplary embodiments of the invention and that modifications may be made without departing from the spirit and scope of the invention as set forth in the following claims.

We claim:

1. An in-line brake (10), comprising:
   a brake track (50);
   a carriage (20) movably disposed within said brake track (50);
   a means to decelerate said carriage (200);
   a trolley engagement means (210) integrated with said carriage (20) to engage with a trolley (130) moving in a direction of travel (140) when said carriage (20) is in a closed position (60), whereby, when said trolley (130) engages with said trolley engagement means (210) said carriage (20) is displaced through the means to decelerate said carriage (200); and
   said carriage (20) capable of being positioned in an open position (80) so that said trolley (130) can continue to move in the direction of travel (140);
   wherein said trolley engagement means (210) is an arm (30) disposed on said carriage (20) extending away from said brake track (50) across said trolley's direction of travel (140) when said carriage is in the closed position (60) to prevent displacement of said trolley (130) past said trolley engagement means (210), said carriage (20) having a hinge (220) and a front wheel (40) rollably engaged with said brake (50); said brake track (50) has a brake track termination area (160) having an extension (170) that extends away from said zip track (50) and oriented substantially perpendicular to said direction of travel (140); and said carriage (20) can pivot via said hinge (220) to enable said front wheel (40) to roll on said extension (170).

2. The in-line brake of claim 1, further comprising:
   said trolley (130) movably disposed within a zip track (70); said zip track (70) connected to said brake track (50).

3. The in-line brake of claim 2, further comprising:
   a harness strap (110) connected to said trolley (130).

4. The in-line brake of claim 1, further comprising:
   a retraction means (190) to displace said carriage (20) opposite said direction of travel (140) and reposition said carriage (20) into the closed position (60).

5. The in-line brake of claim 1, further comprising:
   a harness strap (110) attached to said trolley (130); said harness strap (110) extending downwardly from said trolley (130).

6. The in-line brake of claim 1, wherein when said trolley (130) is travelling in the direction of travel (140) the trolley (130) is descending toward a landing platform (120).

7. An in-line brake (10), comprising:
   a brake track (50);
   a carriage (20) movably disposed within said brake track (50);
   a means to decelerate said carriage (200);
   a trolley engagement means (210) integrated with said carriage (20) to engage with a trolley (130) moving in a direction of travel (140) when said carriage (20) is in a closed position (60), whereby, when said trolley (130)

engages with said trolley engagement means (210) said carriage (20) is displaced through the means to decelerate said carriage (200);

said carriage (20) capable of being positioned in an open position (80) so that said trolley (130) can continue to move in the direction of travel (140);

said trolley (130) movably disposed within a zip track (70); said zip track (70) connected to said brake track (50);

wherein said trolley engagement means (210) is an arm (30) disposed on said carriage (20) extending from said brake track (50) across said trolley's direction of travel (140) when said carriage is in the closed position (60) to prevent said trolley (130) from being displaced past said trolley engagement means (210), and said carriage (20) having a hinge (220) and a front wheel (40) rollably engaged with said brake track (50); said brake track (50) has a brake track termination area (160) having an extension (170) that extends away from said zip track (50) and oriented substantially perpendicular to said direction of travel (140); said carriage 20 can pivot via said hinge (220) to enable said front wheel (40) to roll on said extension (170); a retraction means (190) to displace said carriage (20) opposite said direction of travel (140) and reposition said carriage (20) into the closed position (60); and a harness strap (110) attached to said trolley (130); said harness strap (110) extending downwardly from said trolley (130); wherein when said trolley (130) is travelling in the direction of travel (140) said trolley (130) is descending toward a landing platform (120).

\* \* \* \* \*